United States Patent [19]
Howald

[11] 4,186,508
[45] Feb. 5, 1980

[54] LINE GUIDE FOR FISHING ROD

[75] Inventor: Arthur M. Howald, Perrysburg, Ohio

[73] Assignee: Shakespeare Company, Columbia, S.C.

[21] Appl. No.: 960,701

[22] Filed: Nov. 14, 1978

[51] Int. Cl.² ............... B32B 9/00; A01K 87/04
[52] U.S. Cl. ............................ 43/24; 156/169; 156/172; 156/173; 156/330; 242/7.01; 242/7.02; 428/65; 428/367; 428/902
[58] Field of Search ............... 428/64, 65, 367, 902, 428/408; 156/169, 170, 330; 43/24, 25, 18 R; 242/7.01, 7.02

[56] References Cited
U.S. PATENT DOCUMENTS

| | | | |
|---|---|---|---|
| 2,775,054 | 12/1956 | Shinbane | 43/24 |
| 3,171,228 | 3/1965 | Cwik | 43/24 |

*Primary Examiner*—George F. Lesmes
*Assistant Examiner*—P. Thibodeau
*Attorney, Agent, or Firm*—Hamilton, Renner & Kenner

[57] ABSTRACT

A line guide for a fishing rod having a circular laminate (14) of resin-impregnated graphite fibers and a linear foot laminate (13) of resin-impregnated graphite fibers. The foot is attached to the circular laminate by winding some of the fibers (14) of the circular laminate underlying the foot and others (14') overlying the foot, and then heat-curing the assembly to produce a monolithic line guide and foot structure (12).

12 Claims, 10 Drawing Figures

4,186,508

LINE GUIDE FOR FISHING ROD

TECHNICAL FIELD

Line guides usually in the form of rings are mounted at intervals along the length of a fishing rod to control the motion and direction of the line from the reel, and to minimize casting and fish-playing stresses on the rod.

BACKGROUND ART

Conventional line guides are made of hard materials having corrosion-resistant and wear-resistant properties, such as chrome-plated steel and brass, or stainless steel, to resist the tendency of the line to cut grooves in the guides. Some guides have ceramic or tungsten-carbide inserts to enhance their wear qualities. Certain prior guides have been mounted to wire support frames secured to the rod, and others have been secured as by welding, soldering or brazing to contoured metal feet which are in turn secured to the rod by winding line or tape over the ends of the feet and around the rod.

Such prior line guides add considerable weight to the rod, and it is well known that the rod should be as light in weight as possible to improve castability and minimize the fatigue of the fisherman.

DISCLOSURE OF INVENTION

It is an object of the present invention to provide a novel line guide which is extremely light in weight, highly wearresistant, and has a low coefficient of friction decreasing the drag of the line and increasing casting distance.

Another object is to provide a novel monolithic guide and foot comprising a laminate of graphite fibers impregnated with a thermosetting resin having excellent corrosion and wear-resistant properties.

A further object is to provide a novel hoop-like guide of wound resin-impregnated graphite fibers heat-welded to a foot of resin-impregnated graphite fibers.

Still another object is to provide a novel method of making a plurality of novel guide and foot articles by winding resin-impregnated graphite fibers into a circular or hoop-like laminate, attaching a foot of resin-impregnated graphite fibers to one side of the circular laminate, and heat-curing the assembly into a monolithic guide.

PREFERRED EMBODIMENT FOR CARRYING OUT THE INVENTION

The novel line guide is made from a laminate of graphite fibers impregnated with a thermosetting resin such as an epoxy resin which can be wound into a circular or hoop-like laminate and heat-cured to produce an extremely lightweight, durable and corrosion-resistant guide. The graphite fibers or filaments may be those produced by Union Carbide Corp. under the trademark "THORNEL 300" or graphite filaments similar thereto, and may be of the order of 0.00031 inches in diameter having a flexural modulus of $30 \times 10^6$ p.s.i. The approximate ratio of 60% graphite fibers to 40% resin by volume produces a composite material having a specific gravity about 20% that of steel and having a flexural modulus of $18 \times 10^6$ p.s.i.

Figure 1:
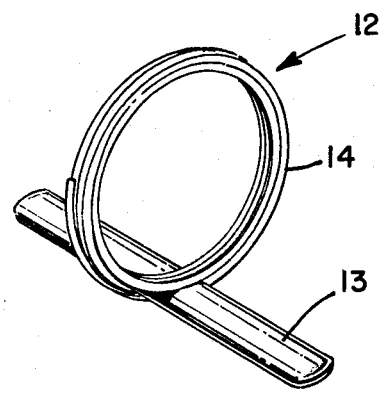
FIG. 1 is a perspective view of the novel line guide and foot embodying the present invention.
Figure 2:
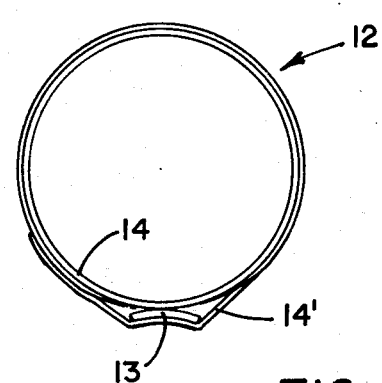
FIG. 2 is an end elevation thereof.

Referring to FIGS. 1 and 2 of the drawings, the line guide laminate of wound heat-cured graphite fibers is indicated generally at 12, and has a mounting strip or foot 13 attached to one side thereof. The foot 13 preferably has linear graphite fibers, of the same type and size as those in guide 12, impregnated with resin in the ratio of 60% graphite fibers to 40% resin. The foot 13 is attached to the guide 12 by winding some of the outer fibers 14 in the guide outwardly around the foot 13, as best indicated at 14' in FIG. 2, and thereafter heat-curing the monolithic guide and foot.

Figure 3:
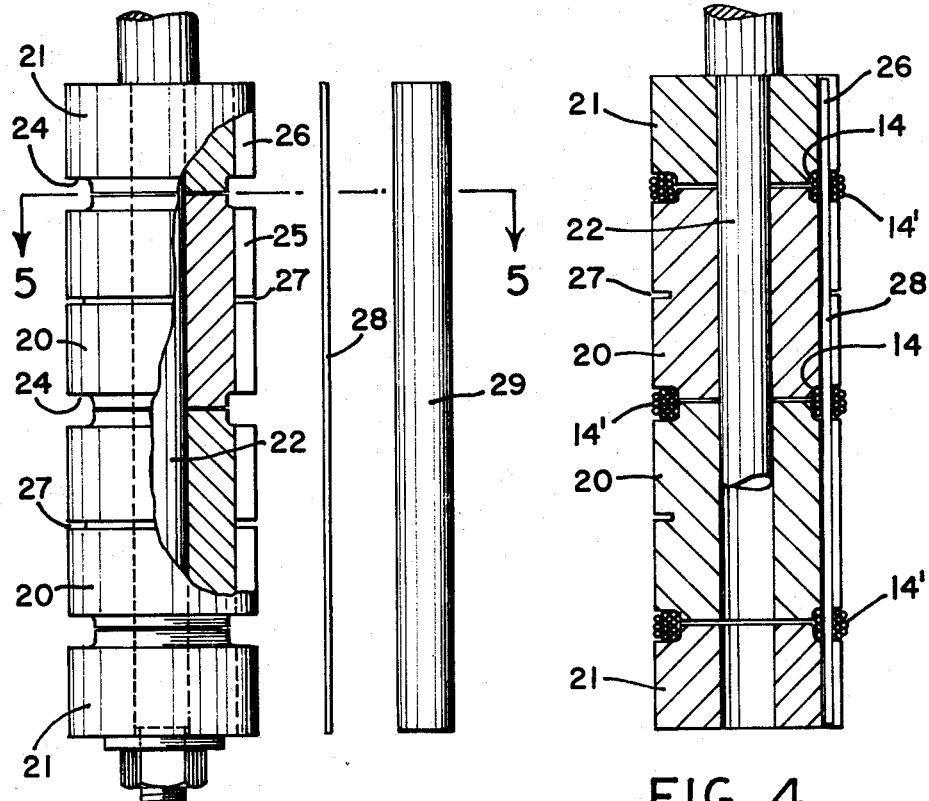
FIG. 3 is a longitudinal sectional view of a die for making a plurality of the novel guides, together with a foot strip and concaving tool in juxtaposition thereto.
Figure 4:
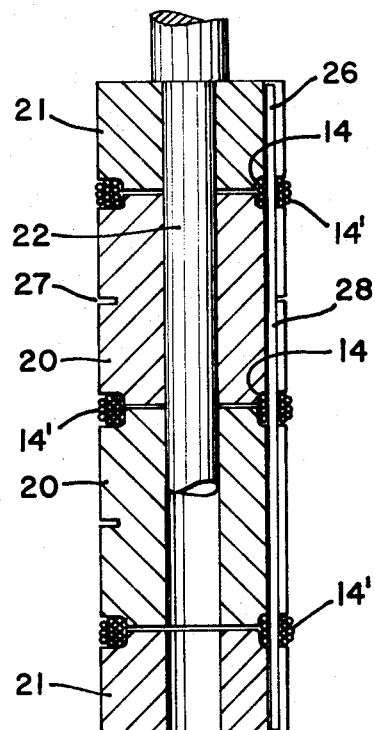
FIG. 4 is a similar view showing the resin-impregnated graphite fibers wound in the grooves of the die and the foot strip in a longitudinal groove in the die with some of the fibers underlying the strip and others overlying the strip.
Figure 5:
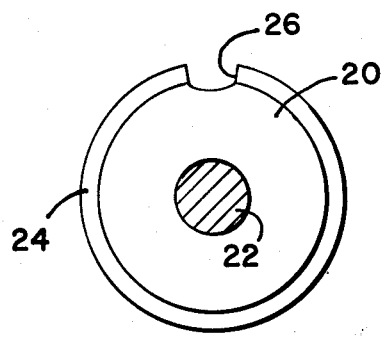
FIG. 5 is a cross section as on line 5—5 of FIG. 4.

The method of making a plurality of the novel guide and foot units preferably comprises utilizing a plurality of cylindrical die blocks 20 and 21 held in axial abutment by a tie bolt 22 passing through their axes. At their abutting faces the blocks 20 and 21 have peripheral notches which when abutted form peripheral grooves 24, three of which are shown in FIGS. 3 and 4. Along one side the die blocks 20,21 are provided with longitudinal slots 25,26, respectively, which terminate at the abutting faces, and the slots are held in longitudinal alignment by the tie bolt 22. Midway of their ends the dies 20 are provided with circumferential cutting grooves 27, for a purpose to be described. The overall length of the aligned slots 25,26 is equal to the length of a strip 28 of foot material and of a cylindrical concaving tool 29 shown in FIG. 3 in juxtaposition to the assembled die blocks 20,21.

Figure 6:
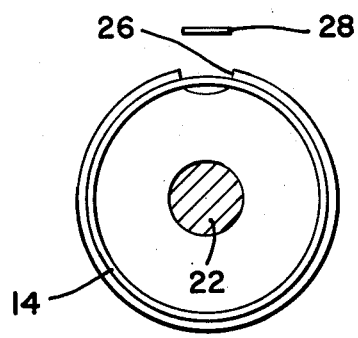
FIG. 6 is a similar view showing the initial fibers wound in the grooves.
Figure 7:
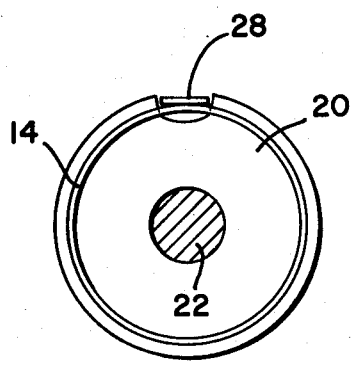
FIG. 7 is a similar view showing the foot strip positioned in the longitudinal groove in the die abutting the underlying fibers.
Figure 8:
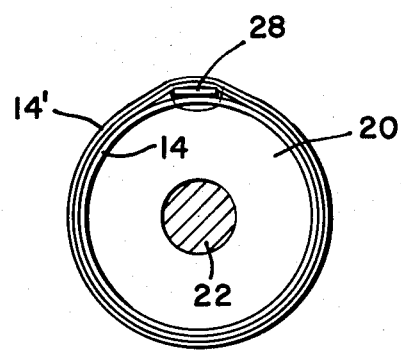
FIG. 8 is a similar view showing additional fibers wound in the grooves and overlying the foot strip.
Figure 9:
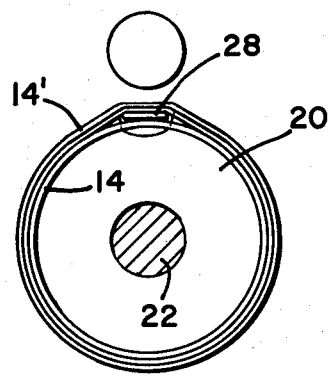
FIG. 9 is a similar view showing the foot strip about to be pressed by a concaving tool.
Figure 10:
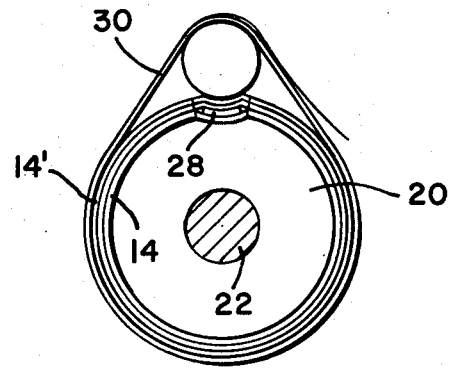
FIG. 10 is a similar view showing how the concaving tool is held in place during the curing operation.

In making the novel guide and foot units, the uncured resin-impregnated graphite fibers are wound in the grooves 24 in amounts sufficient to fill the grooves substantially to the level of the bottoms of slots 25 and 26, as indicated at 14 in FIGS. 3 and 6. Next the foot strip 28 is inserted in the grooves 25,26 as indicated in FIGS. 4 and 7, and then more of the uncured graphite fibers 14' are wound in the grooves overlying the strip 28, as indicated in FIGS. 2, 4 and 8. The concaving tool 29 is then pressed against the fibers 14' passing over the strip 28, as indicated in FIG. 10 and held in that position by tape 30 or the like while the assembly is subjected to heat-curing temperature of about 250° F. for about three hours, which imparts a longitudinally concave contour to the strip as the resin is cured substanitally conforming to the outer contour of a fishing rod. After curing is completed, the strip 28 is cut through at the grooves 27, to provide feet of the lengths shown at 13 in FIG. 1 secured one to each guide 14, and the die blocks disassembled, providing three line guides 12 with feet 13 attached. Finally the end portions of the feet 13 may be tapered by grinding or sanding to make smooth transitions in the winding which engirdles and binds the foot to the rod.

The completed guide and foot 12 becomes a monolithic structure when cured, and the graphite laminate of the guide is not only highly wear-resistant but also is very strong and lightweight, with a low coefficient of friction which decreases the drag of the line passing therethrough and increases casting distance.

I claim:

1. A monolithic line guide and mounting foot for a fishing rod comprising a circular laminate of wound resin-impregnated graphite fibers and linear foot laminate of resin-impregnated graphite fibers heat-welded to one side of said circular laminate in substantial parallelism to the axis thereof, some of the graphite fibers of said circular laminate underlying said foot and others overlying said foot.

2. A line guide and mounting foot as defined in claim 1, wherein the ratio of graphite fibers to resin is about 60% to 40% by volume.

3. A line guide and mounting foot as defined in claim 1, wherein the resin is epoxy.

4. A line guide and mounting foot as defined in claim 3, wherein the ratio of graphite fibers to resin is about 60% to 40% by volume.

5. The method of making lightweight line guide for a fishing rod comprising the steps of winding uncured resin-impregnated graphite fibers into a circular laminate, positioning a linear foot laminate of uncured resin-impregnated fibers exteriorly in contact with one side of said circular laminate and substantially parallel to the axis thereof, winding additional uncured resin-impregnated graphite fibers overlying said circular laminate and said linear laminate, and heat-curing the assembled laminates to produce a monolithic line guide and foot structure.

6. The method as defined in claim 5, wherein said linear laminate is formed into longitudinally concave contour during said heat-curing step.

7. The method as defined in claim 6, wherein the ratio of graphite fibers to resin is about 60% to 40% by volume.

8. The method as defined in claim 7, wherein the resin is epoxy.

9. The method as defined in claim 5, wherein the ratio of graphite fibers to resin is about 60% to 40% by volume.

10. The method as defined in claim 9, wherein the resin is epoxy.

11. The method of making a plurality of lightweight line guides for fishing rods comprising the steps of providing axially abutting dies forming circular winding grooves at the joints and having aligned longitudinal slots in their peripheries, winding uncured resin-impregnated graphite fibers around said grooves into a circular laminate, positioning a continuous linear foot laminate of resin-impregnated graphite fibers in said aligned slots, winding additional uncured resin-impregnated graphite fibers overlying said circular laminate and said linear laminate, heat-curing the assembled laminates, cutting the linear foot between joints to provide a plurality of monolithic line guide and foot structures, and separating the dies at the butt joints to allow removal of said structures.

12. The method as defined in claim 11, wherein said linear laminate is formed into longitudinally concave contour during heat-curing.

* * * * *